United States Patent [19]
Sonoda et al.

[11] Patent Number: 5,519,765
[45] Date of Patent: May 21, 1996

[54] TELEPHONE ANSWERING MACHINE

[75] Inventors: Keiko Sonoda; Toshiaki Sakiyama, both of Fukuoka, Japan

[73] Assignee: Matsushita Electric Industrial Co., Ltd., Osaka, Japan

[21] Appl. No.: 337,815

[22] Filed: Nov. 8, 1994

[51] Int. Cl.⁶ .................................................. H04M 1/64
[52] U.S. Cl. ................................ 379/67; 379/68; 379/88; 379/83
[58] Field of Search .............................. 379/67, 73, 68, 379/100, 77, 78, 88, 89, 83

[56] References Cited

U.S. PATENT DOCUMENTS

| | | | |
|---|---|---|---|
| 3,804,993 | 4/1974 | Honnold et al. | 379/73 |
| 3,931,470 | 1/1976 | Zimmermann | 379/73 |
| 4,072,986 | 2/1978 | Heidergren | 379/73 |
| 4,654,485 | 3/1987 | Yamamoto | 379/73 |
| 5,283,818 | 2/1994 | Klausner et al. | 379/67 |
| 5,301,228 | 4/1994 | Kakigi et al. | 379/73 |
| 5,311,573 | 5/1994 | Otsuki | 379/67 |
| 5,367,560 | 11/1994 | Watanabe et al. | 379/67 |

FOREIGN PATENT DOCUMENTS

| | | | |
|---|---|---|---|
| 2-152393A | 6/1990 | Japan | H04Q 3/58 |
| 3-88549A | 4/1991 | Japan | H04M 1/64 |

*Primary Examiner*—Jeffery Hofsass
*Assistant Examiner*—Scott Wolinsky
*Attorney, Agent, or Firm*—Spencer & Frank

[57] ABSTRACT

A telephone answering machine which includes a recording position memory for storing address data corresponding to a recorded leading position of each message on a recording medium and a number designation device such as a dial pad. When a number input is made by the number designation device at the time of a reproduction operation, the recording position corresponding to this number is indexed, and the message is reproduced. When a key corresponding to a given message is pushed down during reproduction of this message, the message is again reproduced from the start. According to this construction, a message to be reproduced can be designated from a plurality of messages by a one-touch operation, and a desired message can be immediately listened to. When the same key is simply pushed, the message corresponding to the key can be listened to once again.

10 Claims, 5 Drawing Sheets

FIG. 6

TELEPHONE ANSWERING MACHINE

BACKGROUND OF THE INVENTION

This invention relates to a telephone answering machine. More particularly, it relates to a telephone answering machine so constituted as to be capable of designating and listening to a desired message from among a plurality of recorded messages.

The telephone answering machine has been well known in the past as an apparatus which automatically responds to a call signal from a telephone line and records a message of a calling party.

A recording tape has been used as a message recording means in the telephone answering machine, and messages are sequentially recorded from the start point of the recording tape. During reproduction, the messages are sequentially reproduced in the sequence of recording, and an operator can check the contents of the messages.

In the case of the telephone answering machine equipped with a skip or repeat key, an operator can fast-forward the tape to located the recorded position of the next message by pushing down the skip key and can restart tape reproduction if the message he listens to is judged unnecessary. The operator can also locate the recorded position of a message which must be reconfirmed, and can again listen to the message by pushing down the repeat key and rewinding the tape.

However, in the telephone answering machine equipped with the skip or repeat key according to the prior art, it is necessary to detect a non-recorded portion between a message and another message so as to index the start of the desired message by conducting the fast-forward operation or the rewinding operation, or to detect a partition signal inserted between the messages. Consequently, the rewinding and fast-forwarding speeds cannot be improved. Still another problem with the conventional telephone answering machine is that the operator cannot easily and simply designate the message which is desired to be reproduced, and a troublesome operation is necessary.

SUMMARY OF THE INVENTION

In order to solve the problems with the prior art described above, the present invention aims at providing a telephone answering machine which can designate a message to be reproduced by a simple operation from among a plurality of recorded messages.

In a telephone answering machine equipped with recording/reproducing means for recording a message from a calling party incoming through a telephone line on a recording medium and reproducing the message from the recording medium, the telephone answering machine for accomplishing the object described above comprises detection means for detecting either directly or indirectly a recording/reproduction position of the recording medium, recorded position memory means for storing recording position data of each message on the recording medium, operation means for designating the message to be reproduced, and start indexing means for indexing the start of the message designated on the basis of the detection value stored in the recording position memory means and the value presently detected by the detection means.

When the telephone answering machine is of the type which uses a magnetic tape as the recording medium, the detection means detects the number of revolutions of a reel driving shaft for travelling the recording tape and stores the number-of-revolution data of each message corresponding to the recorded leading position on the magnetic tape. Accordingly, when the operator inputs a desired message number through a dial pad and carries out the reproduction operation, the recorded position of the message having the designated number is indexed and the message is reproduced. Accordingly, the operator can immediately listen to the desired message.

DESCRIPTION OF THE PREFERRED EMBODIMENTS

Figure 1:
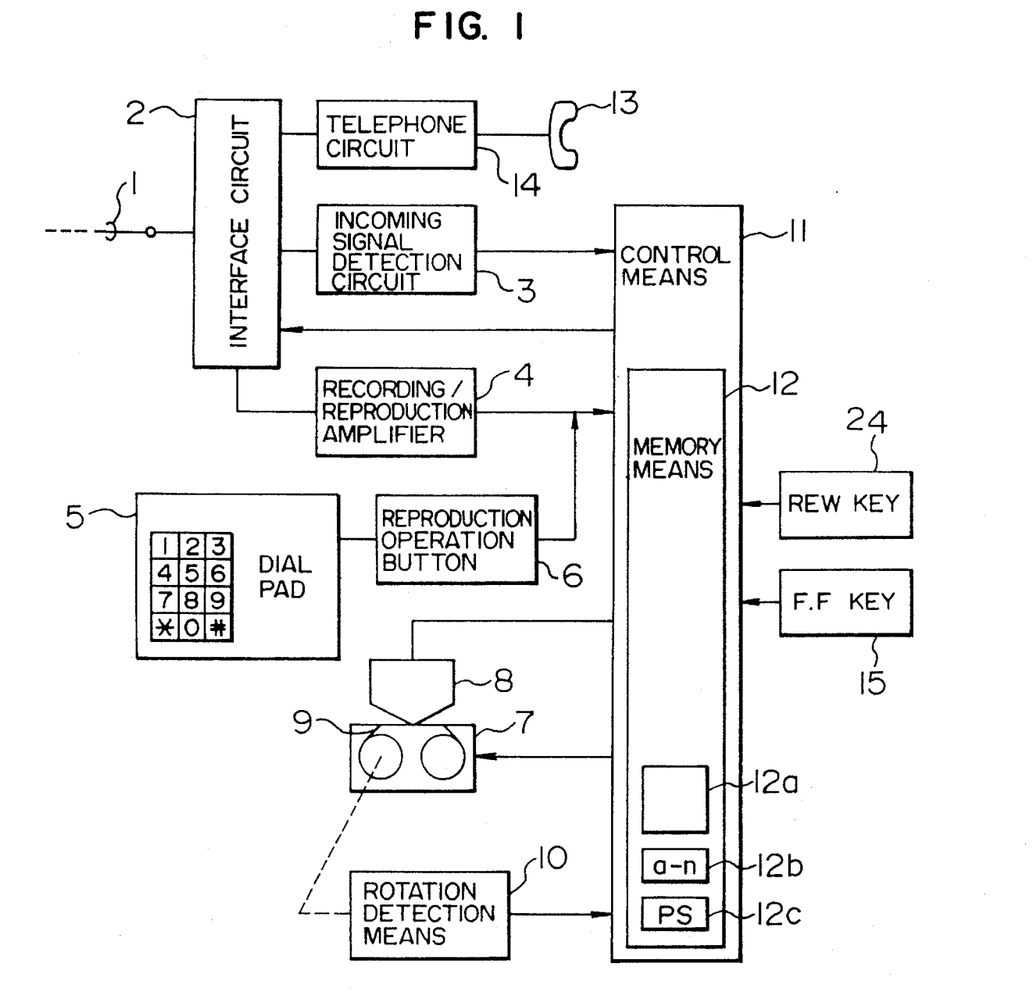
FIG. 1 is a block diagram showing the construction of a telephone answering machine according to first, second and third embodiments of the present invention.

Hereinafter, telephone answering machines according to some preferred embodiments of the present invention will be described. FIG. 1 is a block diagram showing the construction of a telephone answering machine according to the first embodiment. In this drawing, reference numeral 1 denotes a telephone line, and the telephone answering machine is connected to this telephone line 1. Reference numeral 2 denotes an interface circuit to be connected to the telephone line 1 and reference numeral 3 denotes incoming signal detection means for detecting incoming signals which arrive through the telephone line 1. Reference numeral 4 denotes a recording/reproduction amplifier for amplifying speech signals sent through the telephone line 1 for recording, and for amplifying reproduced speech signals for sending them to the telephone circuit 1.

Reference numeral 5 denotes a dial pad, which comprises numeral keys such as "1", "2", "3", . . . , "0" and "*" key and "#" key. This dial pad is also used as message number designation means for designating a message number which is desired to be listened to. Reference numeral 6 denotes a reproduction button for reproducing the recording tape.

Reference numeral 9 denotes the recording tape and 7 denotes tape travelling means for allowing the recording tape 9 to travel. Reference numeral 8 denotes a head for recording an incoming message on the recording tape 9 and for reproducing the speech signal from the recording tape 9. Reference numeral 10 denotes rotation detection means for detecting rotation of a reel driving shaft of the tape travelling means 7.

Reference numeral 11 denotes control means for controlling the present apparatus. The control means 11 comprises a microcomputer. Reference numeral 12 denotes memory means (a volatile memory) accommodated in the microcomputer.

Reference numeral 13 denotes a hand set through which a user can directly make communication, and reference numeral 14 denotes a telephone circuit for amplifying the speech signals, etc.

Hereinafter, the operation of this machine will be broadly explained. The message of a calling party incoming through the telephone line 1 is amplified by the recording/reproduction amplifier 4 and is recorded on the recording tape 9 by the head 8. Whenever the incoming message from the calling party is recorded, the sequence of this message on the recording tape 9 is counted, and its value is the message number corresponding to each message.

When recording is made on the recording tape 9, the control means 11 detects the rotation of the tape on the basis of the detection result of the rotation detection means 10. The message number described above and the number of revolution of the reel driving shaft at the end of the message detected by the rotation detection means 10 are combined as a pair, and are stored in the memory means 12.

Figure 2:
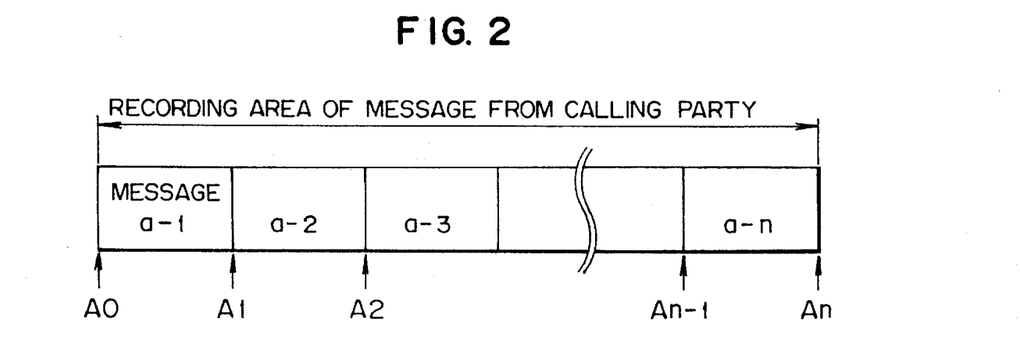
FIG. 2 is an explanatory view useful for explaining a recording area of a tape recorded by the telephone answering machine of FIG. 1.
Figure 4:
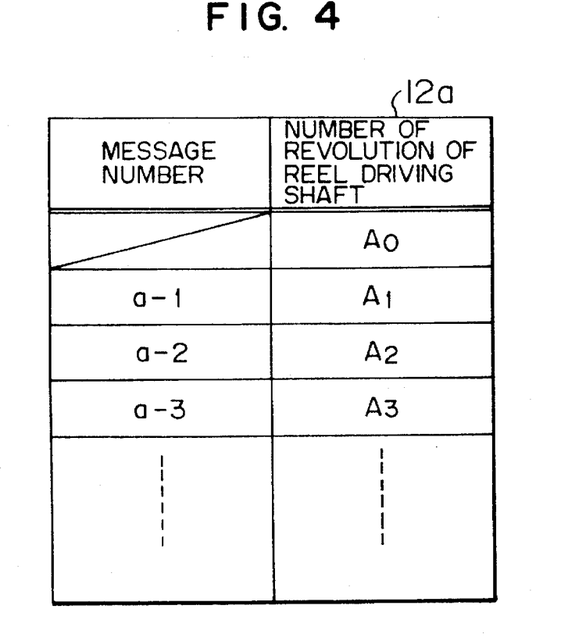
FIG. 4 is an explanatory view useful for explaining the condition of a recorded position memory portion 12a in the telephone answering machine of FIG. 1.

FIG. 2 shows the recording area of the tape 9 on which the incoming messages are recorded. Symbols $A_1, A_2, \ldots A_n$ represent the numbers of revolution of the reel driving shaft at the end point of the recording area of each message. Symbol Ao indicates the number of revolution which represents the start point of the recording area for recording the incoming message from the calling party. FIG. 4 shows the recording position memory portion 12a inside the memory means 12, and the number-of-revolution data Ao, $A_1, \ldots A_n$ are stored with the message numbers (a-1, a-2, . . . , a-n) in the recording position memory portion 12a as shown in FIG. 4.

To listen to the recorded message, the reproduction operation button 6 is pushed down. Receiving this operation, the control means 11 drives the tape travelling means 7 and reproduces the recorded message through the head 8.

When the operator designates the desired message number by the dial pad 5 and pushes down the reproduction operation button 6, the control means 11 causes a fast-forward operation of the tape travelling means 7 while detecting the number of revolutions of the reel driving shaft by the rotation detection means 10 until the message having the designated number arrives at the reproduction position, and thus indexes the start of the target message. Reproduction is carried out after indexing is so made. When the start indexing operation of the recorded tape is carried out, the number-of-revolution data representing the recording start point of the intended message is stored in a start indexing position memory portion 12c inside the memory means 12, by way of example, and then the fast-forward or rewinding operation is executed by the tape travelling means 7 so that the output data of the rotation detection means 10 coincides with the data stored in the start indexing position memory portion 12c under such a condition.

When the message under checking need not be listened to the last, reproduction of the next message can be made by designating the number of the next message by the dial pad 5.

Figure 3:
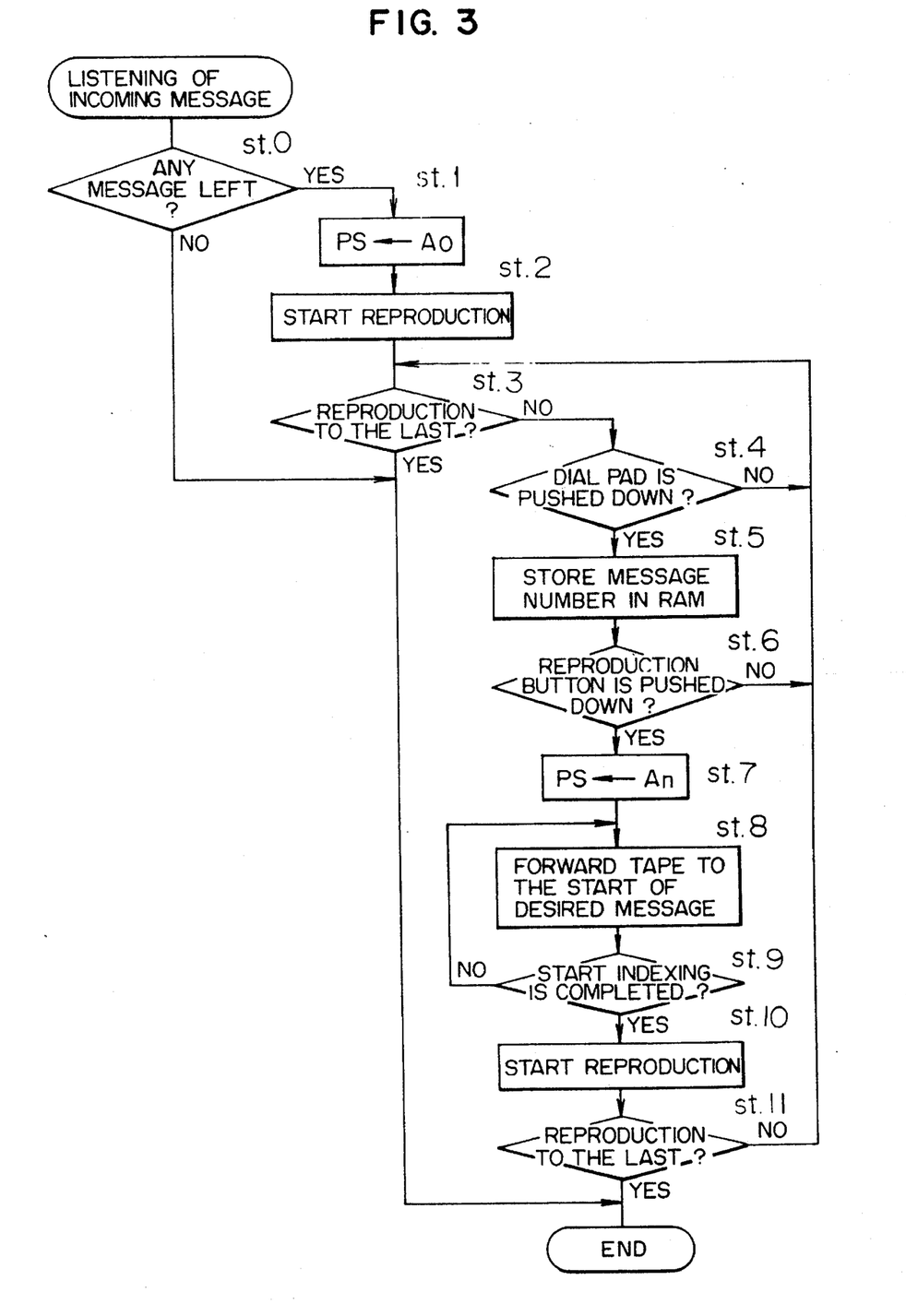
FIG. 3 is a flowchart showing the operation of the telephone answering machine of the first embodiment of the present invention.

The processing steps carried out by the control means 11 for the reproduction of the message of this telephone answering machine are represented by the flowchart of FIG. 3. Next, a detailed explanation will be given with reference to the flowchart.

When the operator conducts the reproduction operation of the incoming message:

Step 0:
Whether or not the incoming message from the calling party is recorded is confirmed by the count number of the incoming messages, and when even one message is judged as being recorded, the flow proceeds to step 1.

Step 1:
Here, the number-of-revolution data Ao of the start point of the recording area (start position of the leading message) is stored as an initial setting in the indexing position memory portion 12c. Symbol PS represents the data inside the index position memory portion 12c.

Step 2:
The reproduction operation of the message is started.

Step 3:
Whether or not reproduction of the message is completed is judged. Here, if the operation of completing reproduction is made by the operator, the reproduction operation is completed in accordance with this reproduction completion operation (Y). When reproduction of the last message is finished, too, the reproduction operation is terminated. When reproduction is continued, the flow proceeds to the next step 4.

Step 4:
The condition of the dial pad 5 is examined, and when push-down of the dial pad 5 by the operator is detected (Y), the flow proceeds to the next step. Here, the operator can designate the message he wants to listen to, by the number key of the dial pad 5. When the operator does not change the reproduction condition of the message (N), the flow returns to the step 2 and reproduction of the message is continued.

Step 5:
The message number (k) designated by the operator is stored in the message data memory portion 2b during reproduction by the memory means 12;

Step 6:
The condition of the reproduction operation button 6 is examined and when push-down of the reproduction operation button 6 is detected within a predetermined time (Y), the flow proceeds to the next step. When the operator pushes down the reproduction operation button 6 immediately after the dial pad 5 is pushed down, the flow proceeds to the next step.

Step 7:
To prepare for the start indexing operation of the message, the data of the number of revolutions corresponding to the start position of the message is read out from the recording position memory portion 12a on the basis of the message number (k) stored in the message data memory portion 12b during reproduction designated by the operator, and is stored in the start indexing position memory portion 12c. Symbol PS represents the data inside the start indexing position memory portion 12c.

Step 8:
The tape travelling means 7 is caused to conduct the fast-forward or rewind operation so as to index the start of the message.

Step 9:
Whether or not indexing of the tape is finished is detected. As an example of the start indexing operation, the tape travelling means 7 is driven to make the fast-forward or rewind operation of the tape until the number of revolution data (Ak) corresponding to the start position of the message having the number (k) is detected by the rotation detection means 10. When the number of revolution (k) corresponding to the start position of the message having the number (Ak) is detected at the step 9, the flow proceeds to the next step 10.

Step 10:

Reproduction of the recorded tape is started. Since this operation is made after the start indexing operation, the message having the designated number (k) designated by the operator is reproduced from the beginning.

Step 11:

Whether or not reproduction of the message is finished is judged. When the message designated by the operator is reproduced to the last, the reproduction operation is as such terminated if the message is the last message on the tape. If other messages are recorded on the tape, the flow returns to step 3. If the operation of reproduction termination is not made by the operator at step 3, the flow returns again to step 4. This operation is repeated until the message finishes.

As described above, it is possible to directly listen to the desired message by designating the message number by the dial pad 5 in the telephone answering machine of this embodiment.

Figure 5A:
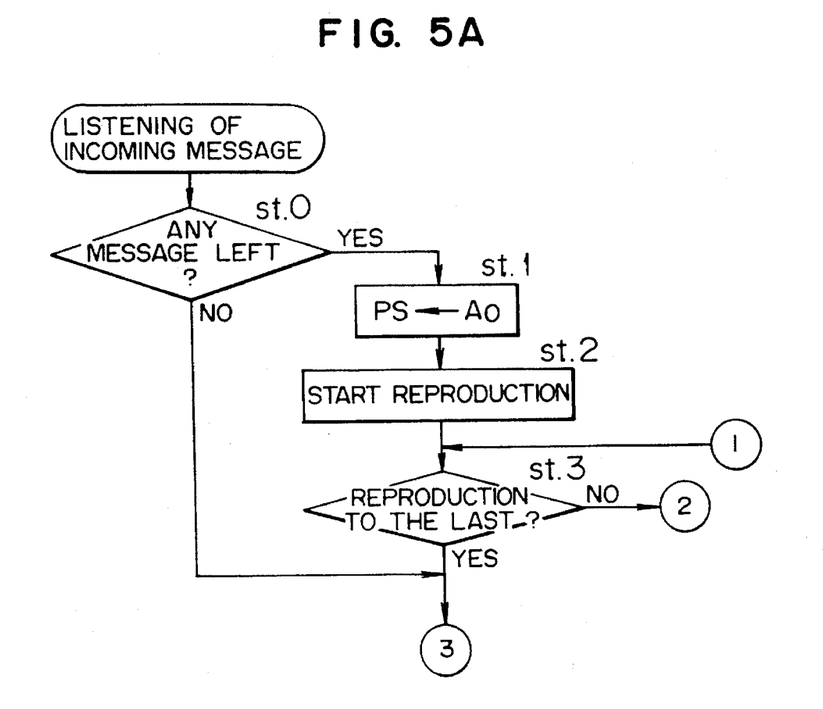
FIGS. 5A, 5B are flowcharts showing the operation of a telephone answering machine according to the second and third embodiments of the present invention.
Figure 5B:
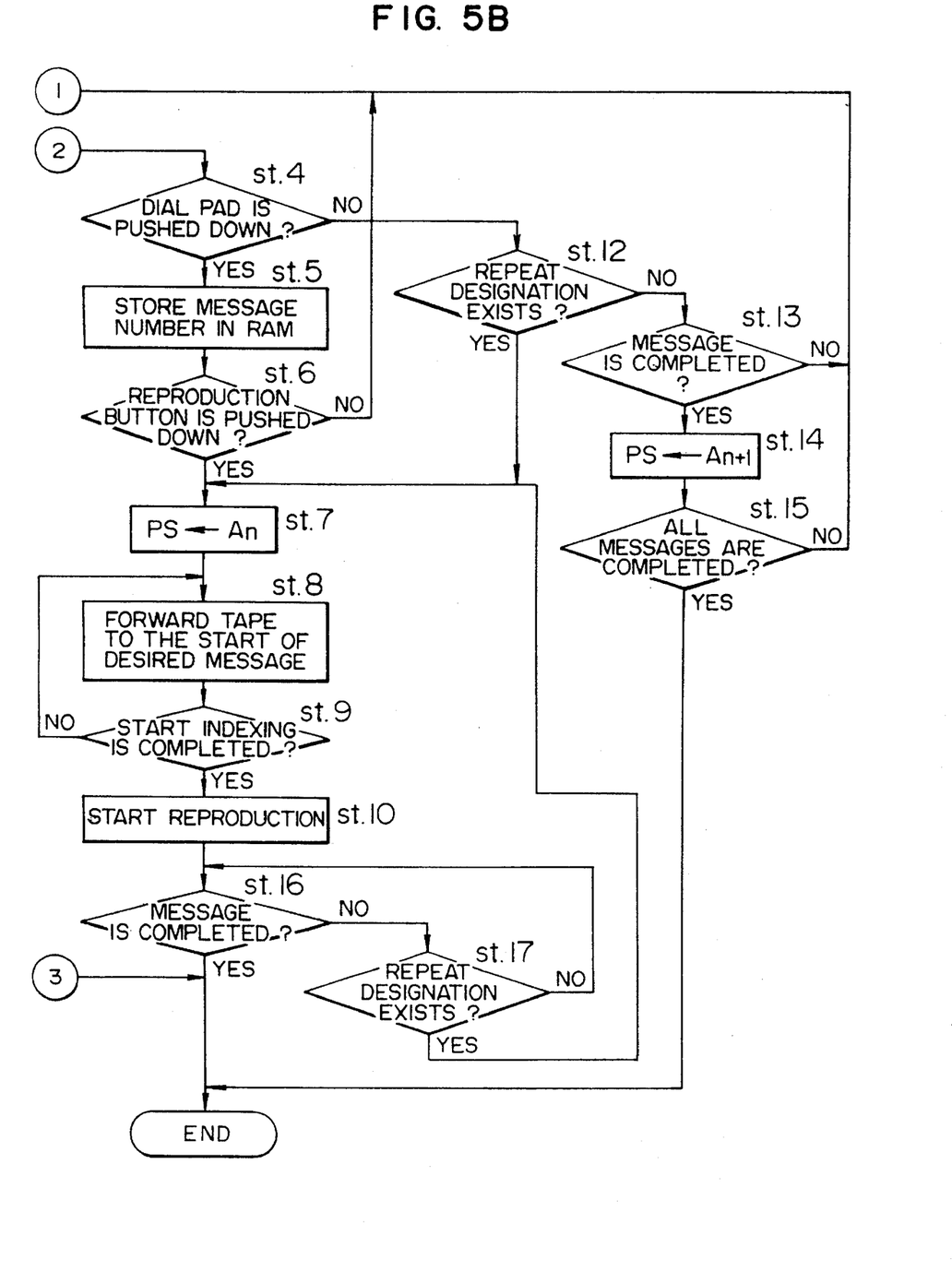

Next, the second embodiment of the present invention, which is furnished with a repeat reproduction function, will be explained. FIGS. 5A and 5B comprise a flowchart showing the operation of the telephone answering machine according to the second embodiment of the present invention. Incidentally, like step numbers will be used to identify like processing steps as in the foregoing embodiment, and individual explanations of repeated steps will be omitted. In FIG. 5B, Step 4:

The condition of the dial pad 5 is examined, and when push-down of the dial pad 5 by the operator is detected (Y), the flow proceeds to the next step.

Step 12:

Whether or not repeat indication exists is examined, and when repeat indication is detected as being absent (Y), the flow proceeds to step 7.

At step 7, the data of the number of revolutions corresponding to the start position of the message is read out from the recorded position memory portion 12a on the basis of the message number (k) stored in the under-reproduction-message data memory portion 12b, and is stored in the start indexing memory portion 12c. At the next step 8, the tape travelling means 7 is caused to make the rewind operation, and the start indexing operation of the message is carried out. When the number of revolution (Ak) stored in the start indexing position memory portion 12c is detected at step 9, the flow proceeds to step 10, where reproduction of the recorded tape is started.

The number-of-revolution data of the start indexing position memory portion 12c at this time corresponds to the start position of the message reproduced at this time (the number of the message data memory portion 12b during reproduction). Accordingly, repeat reproduction of the message during reproduction is carried out by repeat indication by the operator as described above.

Step 13:

Whether or not the message which is reproduced at this time is terminated is judged and if the message continues (N), the flow returns to step 3. When the message reproduced at this time is detected as being terminated, the flow proceeds to the next step 14.

Step 14:

The data of the number of revolution corresponding to the start position of the next message is stored in the start indexing position memory portion 12c.

Step 15:

Whether or not all the messages are delivered is judged and if any message which is not yet reproduced remains (N), the flow returns to step 3. When delivery of all the messages is judged as being finished (Y), the reproduction operation is terminated.

Step 16:

Whether or not the message which is being reproduced at that time is finished is judged and if the message still continues (N), the flow proceeds to step 17.

Incidentally, the dial pad 5 may be utilized as means for designating repeat reproduction. In other words, when the number inputted by the dial pad 5 coincides with the number stored in the under-reproduction-message data memory portion 12b, repeat reproduction is regarded as being designated. If the inputted number coincides with the number stored in the under-reproduction-message data memory portion 12b when the operator operates the dial pad 5 (that is, when the message of the designated number is reproduced), repeat designation is regarded as being made for that message. In other words, Step 17:

Whether or not repeat designation exists is examined and when absence of the repeat designation by the operator is detected as being made (Y), the flow proceeds to step 7.

Next, the third embodiment of the invention, which is equipped with a skip reproduction function, will be explained. When reproduction of the message which is being listened to is interrupted so as to listen to the next message or to the second subsequent message in this embodiment, the desired message is designated by allocating the number "1" to the next message and "2" to the second subsequent message, for example, by using the message which is so far listened to as the reference, and start indexing is made in such a manner as to skip intermediate message(s), if any. In this case, in order to allow the operator to designate skip reproduction, a rewinding designation means, a REW key 24 (FIG. 1), is operated when the skip direction exists in the rewinding direction and a fast-forwarding designation means, an F.F key 15, is operated when the skip direction exists in the fast-forwarding direction.

In other words, when the REW key 24 is pushed down in succession to designation of the message number by the dial pad 5, the recorded messages are counted while the tape is being rewound, and after the tape is rewound in the length corresponding to the number of messages designated by the dial pad 5, start indexing is carried out. When the F.F key 15 is pushed down in succession to designation of the message number by the dial pad 5, the recorded messages are counted while the tape is being fast-forwarded, and start indexing is carried out by advancing the tape in the length corresponding to the designated number of messages.

When the F.F key 15 is pushed down immediately after "1" is pushed down, for example, the start indexing operation of the next message designated by "1" is executed and this message is reproduced. When the F.F key 15 is pushed down immediately after "2" is pushed down, the start indexing operation of the second subsequent message is carried out and this message is reproduced. When the REW key 24 is pushed down immediately after "2" is pushed down, the start indexing operation of the second preceding message designated by "2" is carried out and this message is reproduced once again.

In this embodiment, the number of the message to be reproduced can be detected by adding or subtracting the number inputted by the operation to, or from, the message number (k) stored in the under-reproduction-message data memory portion 12b in the control means 11. When the telephone answering machine is not provided with this under-reproduction-message data memory portion 12b, the number of each message stored in the recording position memory portion 12a is read out on the basis of the present number of revolutions of the reel driving shaft detected by the rotation detection means 10, and which message (message having what sequence number) is reproduced may be grasped on the basis of this data.

Incidentally, the number of revolution Ao at the start of the recording area is not stationary but is updated whenever new data is written into the memory unit 12.

Figure 6:
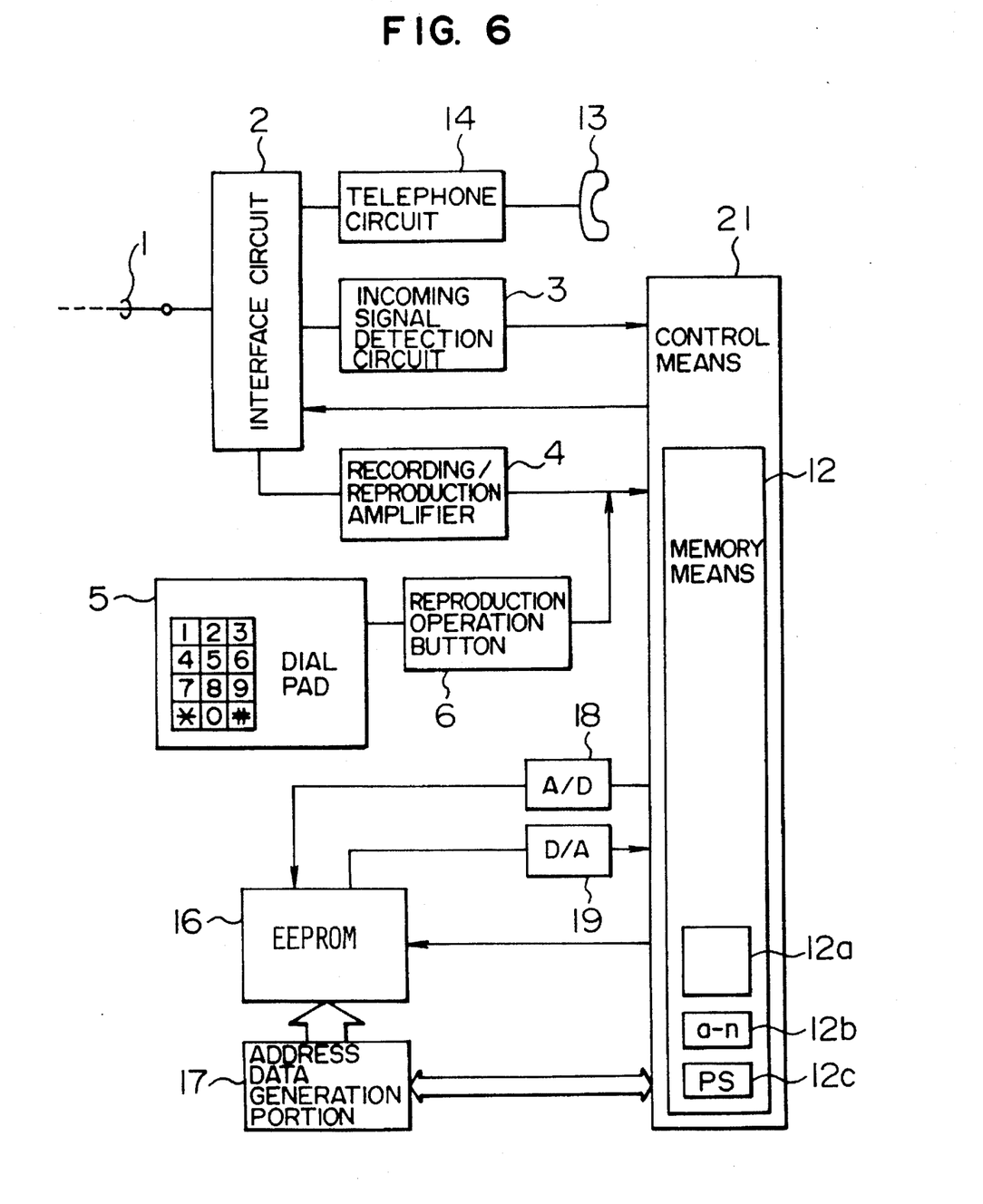
FIG. 6 is a block diagram showing the construction of a telephone answering machine according to a fourth embodiment of the present invention.

Next, the fourth embodiment of the present invention using an electrically erasable and programmable read-only memory (hereinafter referred to as the "EEPROM") as a recording medium for the recording/reproduction means will be explained. FIG. 6 is a block diagram showing the construction of the telephone answering machine according to the fourth embodiment. Incidentally, like reference numerals will be used to identify like constituents as in FIG. 1, and individual explanations of like constituents will be omitted.

In FIG. 6, reference numeral 16 denotes the EEPROM, 17 is an address data generation portion for providing address data to the EEPROM 16, 18 is an A/D conversion circuit for converting an analog speech signal to a digital signal and 19 is a D/A conversion circuit for converting a digital signal to an analog signal. Reference numeral 21 denotes control means comprising a microcomputer, for controlling the present machine. Recording and reproduction of the message are controlled by the control means 21 in the following way.

When a message arrives from a calling party through the telephone line, it is converted to digital signals by the A/D conversion circuit 18 and is stored in the EEPROM 16. At this time, the address data generation portion 17 causes the address data to be sequentially counted up, and provides them to the EEPROM 16. The recorded leading address data of each message on the EEPROM 16 is stored in the recording position memory portion 12a.

When the operator designates the message number by the dial pad 5 for the reproduction operation, the address data representing the recorded leading position of the message corresponding to this inputted number is read out from the recording position memory portion 12a, and the address data generation portion 17 gives this address to the EEPROM 16 and lets it execute the reproduction operation.

The flow of message reproduction is similar to the flow shown in the flowcharts of FIG. 3 or FIGS. 5A and 5B.

In the case of digital recording means using the EEPROM 16, the term "address data" represents the address for accessing the data in this EEPROM, and it is outputted by the address data generation portion. When the message to be reproduced can be designated by using the dial pad as in the foregoing embodiments, the desired message can be designated from a plurality of recorded messages by merely inputting the number by the dial pad, and the intended message can be quickly reproduced. Accordingly, it becomes possible to interrupt reproduction of the message or messages which need not be listened to till the end and to quickly shift the operation to reproduction of the next message. It also becomes possible to quickly grasp the contents of a plurality of messages as a whole, then to designate the message number of the message which may seem particularly important and to repeat the reproduction operation so as to confirm its content.

We claim:

1. A telephone answering machine for recording a message from a calling party incoming through a telephone line on a recording medium and reproducing said message from said recording medium, comprising:

tape recording/reproducing means using a magnetic recording tape as a recording medium and equipped with rotation detection means for detecting rotation of a reel driving shaft of tape travelling means;

recorded position memory means for storing number-of-revolution data corresponding to a recorded leading position of said message on said recording medium;

a start indexing position memory portion for storing position data;

message number designation means for designating a number of a message to be reproduced;

first control means for reading out the number-of-revolution data representing the recorded leading position of a message corresponding to the number designated by said message number designation means, from said recorded position memory means, and storing said number-of-revolution data in said start indexing position memory portion; and second control means for causing said tape recording/reproducing means to drive said tape to the position designated by said number-of-revolution data stored in said start indexing position memory portion, and causing said tape recording/reproducing means to start a reproduction operation from said position.

2. A telephone answering machine for recording a message from a calling party incoming through a telephone line on a recording medium and reproducing said message from said recording medium, comprising:

tape recording/reproducing means using a magnetic recording tape as a recording medium and equipped with rotation detection means for detecting rotation of a reel driving shaft of tape travelling means;

recorded position memory means for storing address data corresponding to a recorded leading position of each message on said recording medium;

a start indexing position memory portion for storing position data;

message number designation means for designating a number of a message on said recording tape to be reproduced;

rewinding designation means for designating the number of a second message on said tape which precedes the number of a first designated message;

fast-forwarding designation means for designating the number of a third message on said tape which follows the number of said first designated message;

first control means for counting the number of recorded messages while effecting rewinding when an operator operates said message number designation means and said first rewinding designation means, and reading out address data representing the recorded leading position of the second message at the position inputted by said message number designation means, from said recorded position memory means, and storing said address data in said start indexing position memory portion;

second control means for counting the number of recorded messages while effecting fast-forwarding when the operator operates said message number designation means and said fast-forwarding designation means, and reading out address data representing a recorded leading position of the third message at the position inputted by said message number designation means, from said recorded position memory means, and storing said address data in said start indexing position memory portion; and third control means for causing said tape recording/reproducing means to drive said tape to the position designated by said number-of-revolution data stored in said start indexing position memory portion, and causing said tape recording/reproducing means to start a reproduction operation from said position.

3. A telephone answering machine according to claim 2, wherein a dial pad is used as said number designation means, a rewind designation key (REW key) is used as said rewinding designation means, and a fast-forwarded designation key (F.F. key) is used as said fast forwarding designation means.

4. A telephone answering machine for recording a message from a calling party incoming through a telephone line on a recording medium and reproducing said message from said recording medium, comprising:

recording/reproducing means so constituted as to execute reproduction from a designated position on said recording medium, said recording/reproducing means being a tape recording/reproducing means using a magnetic recording tape as said recording medium and including rotation detection means for detecting the rotation of a reel driving shaft of tape travelling means;

recorded position memory means for storing address data corresponding to a recorded leading position of said message on said recording medium, said address data being number-of-revolution data of said reel driving shaft obtained by said rotation detection means;

message number designation means for designating a number of a message to be reproduced; and control means for reading out address data representing a recorded leading position of a message corresponding to a number inputted when an operator operates said message number designation means, from said recorded position memory means, and causing said recording/reproducing means to execute a reproduction operation.

5. A telephone answering machine according to claim 4, wherein a dial pad is used as said message number designation means.

6. A telephone answering machine for recording a message from a calling party incoming through a telephone line on a recording medium and reproducing said message from said recording medium, comprising:

recording/reproducing means so constituted as to execute reproduction from a designated position on said recording medium, said recording/reproducing means being a tape recording/reproducing means using a magnetic recording tape as said recording medium and including rotation detection means for detecting the rotation of a reel driving shaft of tape travelling means;

recorded position memory means for storing address data corresponding to a recorded leading position of said message on said recording medium, said address data being number-of-revolution data of said reel driving shaft obtained by said rotation detection means;

under-reproduction-message data memory portion for storing a number of a message under reproduction;

repeat reproduction designation means for designating repeat reproduction of a message; and control means for reading out address data representing a recorded leading position of a message having a number stored in said under-reproduction-message data memory portion when an operator operates said repeat reproduction designation means, from said recorded position memory means, designating a position represented by said address data, and causing said recording/reproducing means to execute a reproduction operation.

7. A telephone answering machine for recording a message from a calling party incoming through a telephone line on a recording medium and reproducing said message from said recording medium, comprising:

recording/reproducing means so constituted as to execute reproduction from a position designated by address data in accordance with said address data designating the reproduction position on said recording medium, said recording/reproducing means being a tape recording/reproducing means using a magnetic recording tape as said recording medium and including rotation detection means for detecting the rotation of a reel driving shaft of tape travelling means, and said address data being number-of-revolution data of said reel driving shaft obtained by said rotation detection means;

recorded position memory means for storing address data corresponding to a recorded leading position of said message on said recording medium;

message number designation means for designating a number of a message to be reproduced;

repeat reproduction designation means for designating repeat reproduction of a message;

under-reproduction-message data memory portion for storing a number of a message under reproduction or address data corresponding to a recorded leading position of a message under reproduction;

first control means for reading out address data representing a recorded leading position of a message corresponding to a number inputted when an operator operates said message number designation means, from said recorded position memory means, giving said address data to said recording/reproducing means to cause said recording/reproducing means to start a reproduction operation, and storing the number of the message corresponding to the number inputted or the address data representing the recorded leading position in said under-reproduction-message data memory portion; and second control means for giving said address data representing the recorded leading position of said message having a number stored in said under-reproduction-message data memory portion when the operator operates said repeat reproduction designation means, to said recording/reproducing means and causing said recording/reproducing means to start the reproduction operation.

8. A telephone answering machine according to claim 7, wherein a dial pad is used as said message number designation means.

9. A telephone answering machine according to claim 7, wherein a dial pad is used as said repeat reproduction designation means, repeat reproduction being designated when a number inputted by said dial pad coincides with the number stored in said under-reproduction-message data memory portion.

10. A telephone answering machine for recording a message from a calling party incoming through a telephone line on a recording medium and reproducing said message from said recording medium, comprising:

recording/reproducing means so constituted as to execute reproduction from a designated position on said recording medium, said recording/reproducing means being a tape recording/reproducing means using a magnetic recording tape as said recording medium and including rotation detection means for detecting the rotation of a reel driving shaft of tape travelling means;

recorded position memory means for storing address data corresponding to a recorded leading position of said message on said recording medium, said address data being number-of-revolution data of said reel driving shaft obtained by said rotation detection means;

under-reproduction-message data memory portion for storing a number of a message under reproduction;

repeat reproduction designation means for designating repeat reproduction of a message, said repeat reproduction designation means being a dial pad for designating when a number inputted by said dial pad coincides with the number stored in said under-reproduction-message data memory portion; and control means for reading out address data representing a recorded leading position of a message having a number stored in said under-reproduction-message data memory portion when an operator operates said repeat reproduction designation means, from said recorded position memory means, designating a position represented by said address data, and causing said recording/reproducing means to execute a reproduction operation.

* * * * *